(12) United States Patent
Komatsu

(10) Patent No.: US 6,485,228 B1
(45) Date of Patent: Nov. 26, 2002

(54) METHOD AND DEVICE FOR RECOVERING LIQUID SUBSTANCE

(75) Inventor: Masahiro Komatsu, Kawasaki (JP)

(73) Assignee: The Nippon Salvage Co., Ltd., Tokyo (JP)

( * ) Notice: Subject to any disclaimer, the term of this patent is extended or adjusted under 35 U.S.C. 154(b) by 0 days.

(21) Appl. No.: 09/857,997

(22) PCT Filed: Dec. 17, 1999

(86) PCT No.: PCT/JP99/07103
§ 371 (c)(1),
(2), (4) Date: Oct. 1, 2001

(87) PCT Pub. No.: WO00/40807
PCT Pub. Date: Jul. 13, 2000

(30) Foreign Application Priority Data

Dec. 28, 1998 (JP) ............................................. 10-373979

(51) Int. Cl.[7] ............................ F16L 53/00; H05B 3/34; H05B 3/54; H05B 6/10
(52) U.S. Cl. .......................... 405/52; 137/341; 219/528; 219/538; 219/630; 219/635
(58) Field of Search ..................... 405/52, 60; 137/334, 137/341; 219/618, 628, 643–646, 675, 520, 523, 528, 538

(56) References Cited

U.S. PATENT DOCUMENTS

| 2,302,774 | A | * | 11/1942 | Jarvis | 166/61 |
| 3,053,959 | A | * | 9/1962 | Christmann | 219/629 |
| 3,663,730 | A | * | 5/1972 | Gates | 219/602 |
| 3,824,364 | A | * | 7/1974 | Cachat | 166/60 |
| 4,486,149 | A | * | 12/1984 | Merkel | 222/146.5 |
| 5,252,808 | A | * | 10/1993 | Morgan | 12/343.5 A |
| 5,352,862 | A | * | 10/1994 | Barr | 123/142.5 R |
| 5,526,561 | A | * | 6/1996 | McGaffigan | 219/643 |
| 5,750,962 | A | * | 5/1998 | Hyatt | 126/263.01 |
| 6,142,707 | A | * | 11/2000 | Bass et al. | 137/341 |
| 6,264,401 | B1 | * | 7/2001 | Langner et al. | 137/341 |
| 6,315,497 | B1 | * | 11/2001 | Wittman et al. | 405/158 |

FOREIGN PATENT DOCUMENTS

| EP | 0 007 891 | 2/1980 |
| JP | 54-94169 | 7/1979 |
| JP | 5-98626 | 4/1991 |
| JP | 10-306431 | 4/1997 |

* cited by examiner

*Primary Examiner*—Thomas B. Will
*Assistant Examiner*—Tara L. Mayo
(74) *Attorney, Agent, or Firm*—Hedman & Costigan, P.C.

(57) ABSTRACT

A method for recovering a liquid substance such as fuel oil from ships sunk or stranded due to marine accidents and from storage facilities by more easily heating the liquid substance to reduce its viscosity, and a device for recovering liquid substance. A working coil (2) is applied to the inner bottom plate (7) of a conductive tank (6) in contact with the liquid substance to be recovered, a high-frequency current is supplied to the working coil (2) from a high-frequency inverter unit (3) to heat the inner bottom plate (7) itself by induction heating and the liquid substance is reduced in viscosity by the heating for recovery via a recovery pipe (5) connected to a pump (4). Therefore, an object to be heated can be heated in contact with a heat source and efficiently without an intermediate heat loss, no bulky steam boiler nor large occupied space is required for ease of handling and working, manpower and working hours can be significantly reduced, a quick measure can be taken when a marine accident occurs, and an effect of weather is more likely to be avoided.

5 Claims, 9 Drawing Sheets

METHOD AND DEVICE FOR RECOVERING LIQUID SUBSTANCE

FIELD OF THE INVENTION

This invention relates to a method for recovering a liquid substance and a device for recovering a liquid substance suitable for recovering a liquid substance such as fuel oil from ships sunk or stranded due to marine accidents and other places and relates to a method for recovering a liquid substance and a device for recovering a liquid substance capable of heating a liquid substance such as fuel oil more easily than in the past by high-frequency induction heating to reduce viscosity of the liquid substance for recovery.

BACKGROUND OF THE INVENTION

Ships, not only oil tankers, generally sail with a large amount of liquid substance such as fuel oil loaded in the ships. When, therefore, a ship has encountered marine accidents such as stranding and sinking, it becomes necessary to recover fuel oil or the like from its tank for preventing it from flowing out.

Fuel oil represented by a heavy oil or crude oil, however, tends to be affected by temperature and is brought to a state which is almost solid, for example, in the coldest season or in a low temperature environment of the deep sea. Therefore, when a marine accident has occurred, fuel oil or the like remaining in the ship is recovered after it is heated to flow easily.

In a case where, for example, fuel oil is recovered from a stranded ship, steam or hot water obtained by heating in a boiler is supplied to the tank for heating or a Nichrome (trademark) wire heater is inserted in the tank for heating. In a case where fuel oil is recovered from a ship sunk in the shallow sea, a boiler, a water supply tank and a generator are loaded in a work ship and a hot water hose and a recovery pipe etc. are put down from the work ship to the sunk ship for heating.

A sea area where a ship may be stranded, however, does not allow easy access from the land. Neither is it approached easily from offshore. For this reason, a preparatory work for carrying a large scale heating equipment such as a large boiler to the site where the ship is stranded and installing the equipment there requires an enormous labor and time and, moreover, there are not a few cases where it cannot be installed in the site due to adverse conditions. In a case where it can be installed in the stranded ship or in the vicinity thereof, heating can be made by means of hot water, electric heating, hot blast and the like but in a case where it cannot be installed in the vicinity of the stranded ship, it must be installed on the land at a long distance or the work ship must lie at anchor at a long distance.

When a heat source for heating is installed in a place at a long distance in this manner, hot water or steam must be delivered to the distant site of stranding by using a long hose and, therefore, there occurs a large amount of heat loss on the way and, in some cases, failure in achieving an effective heating. Even when an effect of heating is obtained, if the route for transferring fuel oil or the like taken out of the stranded ship to a recovery tank is long, the fuel oil or the like is cooled on the way and, as a result, there occurs a case where its viscosity increases to such a degree that it will not flow, i.e., it cannot be recovered.

Further, since there is no means for effectively heating the inside of a tank and a hose containing fuel oil or the like from outside thereof, a workman had to place a steam coil, a hot water coil, an electrical heating coil or the like in the tank for heating or he had to blow steam directly for heating. Since the tank of a ship is provided inside with many structures such as a side girder, a bottom longeron and a floor which is a lateral structural member, work for installing the steam coil or the like is troublesome and, in some cases, location thereof is restricted depending upon the inside construction of the tank. The direct blowing of steam also is troublesome because it cannot be performed in one place only. Moreover, work in the tank is dangerous because the stranded ship is in an insecure state and there is also possibility of fire, explosion or gas-poisoning.

In the case of recovering fuel oil or the like from the sunk ship, a hot water hose, a recovery pipe etc. must be put down from the work ship to the sunk ship and these hose and pipe are so thick that a troublesome work is required. Further, since the hose and pipe are affected by a tidal current when they are put down in the sea, work cannot be performed when tidal current is fast. Furthermore, since the hose and pipe are cooled by the sea water when they are put down in the sea, there occurs a large amount of heat loss with the result that there occur a case where the fuel oil or the like to be recovered cannot be heated effectively or a case where viscosity of the fuel oil or the like increases to such a degree that difficulty arises in its flow or it does not flow at all.

For these reasons, when a ship is sunk in the deep sea, an effective recovery cannot be made but the ship is left as it is.

In the case of stranding or sinking of a ship, installation and recovery of a heating equipment and hose etc. take a long time and a periodical visit of bad weather during this time cannot be avoided. For this reason, there are not a few cases where a ship is heavily damaged and all of fuel oil or the like flows out of the ship to cause environmental pollution. In a case where fuel oil or the like which has flowed out and is floating on the sea is recovered by using an oil skimmer, volatile ingredients contained in the fuel oil or the like are volatilized and the fuel oil or the like is cooled down and, therefore, viscosity thereof increases and it becomes difficult to absorb and recover it with the oil skimmer and, in many cases, it actually cannot be absorbed.

In a case where a marine accident has occurred in a chemical tanker or the like storing a chemical substance of a high viscosity, it becomes necessary to recover the chemical substance from a storage tank. In this case also, for the same reason that has been described above, heating cannot be conducted easily. Further, not only in a case where an accident has occurred in ships in general but also in a case where an accident has occurred in facilities located in the sea or on the seaside such as an oil field drilling rig and a crude oil loading and unloading facility, it becomes necessary to quickly recover a liquid substance such as a heavy oil.

The present invention is proposed in the above described circumstances. It is an object of the invention to provide a method for recovering a liquid substance and a device for recovering a liquid substance capable of recovering a liquid substance such as fuel oil from a sunk or stranded ship etc. by heating it more easily than in the past.

SUMMARY OF THE INVENTION

The present invention provides a method for recovering a liquid substance characterized by applying a working coil to a liquid substance contacting member which is in contact with the liquid substance and is made of an electric conductor, supplying a high frequency current from a high frequency inverter unit to the working coil to cause the liquid substance contacting member itself to generate heat by induction heating and thereby reducing the viscosity of the liquid substance, and recovering this liquid substance through a recovery pipe connected to the pump.

According to this invention, since a working coil is applied to a liquid substance contacting member which is in contact with the liquid substance and is made of an electric conductor, a high-frequency current from a high-frequency inverter unit is supplied to the working coil to cause the liquid substance contacting member itself to generate heat by induction heating and viscosity of the liquid substance thereby is reduced, heating can be made with a heat source in contact with an object to be heated. Therefore, heating can be made efficiently without heat loss on the way as in the steam heating and hot blast. Neither is a bulky boiler required nor a broad occupying space is required.

Further, since a steam hose etc. which are troublesome in handling are not required, work efficiency is excellent and saving of labor and significant shortening of work time can be realized. By shortening of work time, work can be performed without being much affected by weather.

Further, in a case where recovery from a sunk ship is made, since a pipe put down from a work ship is only a recovery pipe and heating energy is supplied by an electric wire which is much thinner than a pipe, influence of tidal current can be reduced and interruption time can thereby be reduced. Even in a case where work has to be interrupted, time required for withdrawal is shortened and preparation for resumption of work can be completed in a short period of time because electric wire which is easy to handle is a main item to be handled. Consequently, work efficiency of the entire work can be remarkably improved.

The present invention further provides a method for recovering a liquid substance by constructing at least a part of the recovery pipe with a pipe section made of an electrical conductor and mounting a working coil on an outer peripheral surface of the pipe section made of the electric conductor, supplying a high frequency current to this working coil from the high-frequency inverter unit to cause the pipe section made of the electric conductor itself to generate heat by induction heating to thereby raise the temperature of the liquid substance in the pipe section made of the electric conductor, and recovering the liquid substance.

According to the invention, since at least a part of the recovery pipe is constructed with a pipe section made of an electric conductor, a working coil is mounted on an outer peripheral surface of the pipe section made of the electric conductor, a high-frequency current is supplied to this working coil from the high-frequency inverter unit to cause the pipe section made of the electric conductor itself to generate heat by induction heating to thereby raise the temperature of the liquid substance in the pipe section made of the electric conductor, and the liquid substance is recovered, increase of viscosity of the extracted liquid substance on the way can be certainly prevented and a recovery work can be conducted smoothly in the coldest season.

The present invention further provides a device for recovering a liquid substance characterized by comprising:

a working coil which is mountable on a liquid substance contacting member which is a member of a tank containing a liquid substance is in contact with the liquid substance contained in it or flowing through it and is made of an electric conductor;

a high frequency inverter unit for supplying a high-frequency current to the working coil; and a recovery pipe which is connected to a pump and is adapted to be connected to the liquid substance contacting member;

a high-frequency current being supplied from the high-frequency inverter unit to the working coil to cause the liquid substance contacting member itself to generate heat by induction heating to thereby reduce viscosity of the liquid substance, and the liquid substance being recovered through the recovery pipe by operation of the pump.

According to this invention, since a working coil is applied to a liquid substance contacting member which is in contact with the liquid substance and is made of an electric conductor, a high-frequency current from a high-frequency inverter unit is supplied to the working coil to cause the liquid substance contacting member itself to generate heat by induction heating and viscosity of the liquid substance thereby is reduced, heating can be made with a heat source in contact with an object to be heated. Therefore, heating can be made efficiently without heat loss on the way as in the steam heating and hot blast. Neither is a bulky boiler required nor a broad occupying space is required.

Further, since a steam hose etc. which are troublesome in handling are not required, work efficiency is excellent and saving of labor and significant shortening of work time can be realized. By shortening of work time, work can be performed without being much affected by weather.

Further, in a case where recovery from a sunk ship is made, since a pipe put down from a work ship is only a recovery pipe and heating energy is supplied by an electric wire which is much thinner than a pipe, influence of tidal current can be reduced and interruption time can thereby be reduced. Even in a case where work has to be interrupted, time required for withdrawal is shortened and preparation for resumption of work can be completed in a short period of time because electric wire which is easy to handle is a main item to be handled. Consequently, work efficiency of the entire work can be remarkably improved.

In addition, the present invention provides a device for recovering a liquid substance wherein the working coil comprises a cylinder case made of a nonmagnetic material and being divided in axial direction and a working coil main body housed in the cylindrical case, said cylindrical case being provided with a hinge in the divided portion to be openable in its side portion and being provided with a closed state maintaining mechanism in its openable divided portion, and the case being adapted to be mounted on an outer peripheral surface of the liquid substance contacting member with the side portion of the case being in an opened state and being maintained in a closed state by means of the closed state maintaining mechanism.

According to the invention, since the working coil comprises a cylindrical case made of a nonmagnetic material and being divided in axial direction and a working coil main body housed in the cylindrical case and said cylindrical case is provided with a hinge in the divided portion to be openable in its side portion and is provided with a dosed state maintaining mechanism in its openable divided portion, the case can be mounted in a simple manner on an outer peripheral side of a pipe section or the like and, therefore, handling becomes easy.

In addition, the present invention provides a device for recovering a liquid substance wherein the working coil comprises a case in the form of a mat which is made of a nonmagnetic and flexible material, a working coil main body housed in the case, and an attaching mechanism for attaching the case to the liquid substance contacting member, the case being applied to a surface of the liquid substance contacting member and attached to the liquid substance contacting member by means of the attaching mechanism.

According to the invention, since the working coil comprises a case in the form of a mat which is made of a nonmagnetic and flexible material, a working coil main body housed in the case, and an attaching mechanism for attaching the case to the liquid substance contacting member, the working coil can be mounted on a curved surface of the liquid substance contacting member even in case the surface is curved. Therefore, a gap between the working coil and the liquid substance contacting member can be reduced and the efficiency of induction heating by the working coil thereby can be improved.

Further, when the working coil is made in the form of a mat, the case in the form of a mat which is made of a nonmagnetic material is covered on the liquid substance contacting member in use and, therefore, a thermal insulation effect for reducing escape of heat of the liquid substance contacting member to the outside can be expected. Accordingly, it contributes to improving efficiency of heating the liquid substance.

In addition, the present invention provides a device for recovering a liquid substance wherein at least a part of the recovery pipe is constructed with a pipe section made of an electric conductor and a working coil is mounted on an outer peripheral surface of the pipe section made of the electrical conductor, a high-frequency current being applied to this working coil from the high-frequency inverter unit to cause the pipe section made of the electric conductor itself to generate heat by induction heating to raise the temperature of the liquid substance in the pipe section made of the electric conductor for recovery of the liquid substance.

According to the invention, since at least a part of the recovery pipe is constructed with a pipe section made of an electric conductor, a working coil is mounted on an outer peripheral surface of the pipe section made of the electric conductor, and a high-frequency current is supplied to this working coil from the high-frequency inverter unit to cause the pipe section made of the electric conductor itself to generate heat by induction heating to raise the temperature of the liquid substance in the pipe section made of the electric conductor for recovery of the liquid substance., troubles which are caused by increase in viscosity of the liquid substance on the way can be eliminated.

In addition, the present invention provides a device for recovering a liquid substance wherein the recovery pipe comprises a temperature raising unit provided in the middle thereof, said temperature raising unit comprising a cylindrical case which is divided in two parts in axial direction, provided with a hinge in the divided portion so that the case is openable in its side portion and provided with a closed state maintaining mechanism in the openable divided portion, a working coil main body housed in the cylindrical case, and a heating member made of an electrical conductor which is provided on a central axis side of the working coil main body, said heating member itself being heated by induction heating by a high frequency current being supplied by the high-frequency inverter unit used to raise the temperature of the liquid substance in the recovery pipe.

According to the invention, since the recovery pipe comprises a temperature raising unit provided in the middle thereof, said temperature raising unit comprising a cylindrical case which is divided in two parts in axial direction, provided with a hinge in the divided portion so that the case is openable in its side portion and provided with a closed state maintaining mechanism in the openable divided portion, a working coil main body housed in the cylindrical case, and a heating member made of an electric conductor which is provided on a central axis side of the working coil main body, said heating member itself can be heated by induction heating by a high-frequency current supplied from the high-frequency inverter unit to raise temperature of the liquid substance in the recovery pipe and, therefore, troubles caused by increase in viscosity of the liquid substance on the way can be eliminated.

In addition, the present invention provides a device for recovering a liquid substance wherein:
  a working coil which is adapted to be inserted from outside to inside of a liquid substance portioning member which defines a section containing a liquid substance to be recovered;
  a high-frequency inverter unit for supplying a high-frequency current to the working coil; and
  a recovery pipe connected to a pump,
  said working coil being connected to an end portion of the recovery pipe and comprising a cylinder made of an electric conductor which is adapted to be inserted inwardly of an opening formed in the liquid substance portioning member, and a working coil main body wound on a peripheral surface of the cylinder, and
  said cylinder being inserted into the section inside of the liquid substance portioning member and used as a liquid substance contacting member, and, in this state, a high-frequency current being supplied from the high-frequency inverter unit to the working coil to cause the cylinder itself to generate heat by induction heating and thereby reduce viscosity of the liquid substance inside, and the liquid substance being recovered through the recovery pipe by operation of the pump.

According to the invention, since the device comprises a working coil which is adapted to be inserted from outside to inside of a liquid substance partitioning member which defines a section containing a liquid substance to be recovered, a high-frequency inverter unit for supplying a high-frequency current to the working coil, and a recovery pipe connected to a pump, the working coil is connected to an end portion of the recovery pipe and comprises a cylinder made of an electric conductor which is adapted to be inserted inwardly of an opening formed in the liquid substance partitioning member, and a working coil main body wound on a peripheral surface of the cylinder, said cylinder is inserted into the section inside of the liquid substance partitioning member and used as a liquid substance contacting member, and, in this state, a high-frequency current is supplied from the high-frequency inverter unit to the working coil to cause the cylinder itself to generate heat by induction heating and thereby reduce viscosity of the liquid substance inside, and the liquid substance which has been made to flow more easily can be recovered through the recovery pipe by operation of the pump, a portion which is absorbed by the recovery pipe can be heated more efficiently for recovery.

In addition, the present invention provides a device for recovering a liquid substance comprising:
  a table;
  a float which floats on water for floating the table in such a manner that a liquid substance to be recovered flows onto an upper surface of the table;
  a liquid substance contacting member made of an electric conductor and provided on the upper surface of the table;

a working coil provided in the table;

a high-frequency inverter unit for supplying a high-frequency current to the working coil; and a recovery pipe connected to a pump and having an inlet formed in the foremost end portion thereof for sucking in the liquid substance from the table, a high-frequency current being supplied from the high-frequency inverter unit to the working coil to cause the liquid substance contacting member itself to generate heat by induction heating and thereby reduce viscosity of the liquid substance on the table, and the liquid substance being recovered by sucking in the liquid substance by inlet of the recovery pipe by operation of the pump.

According to the invention, since the device comprises a table, a float which floats on water for floating the table in such a manner that a liquid substance to be recovered flows onto an upper surface of the table, a liquid substance contacting member made of an electric conductor and provided on the upper surface of the table, a working coil provided in the table, a high-frequency inverter unit for supplying a high-frequency current to the working coil, and a recovery pipe connected to a pump and having an inlet formed in the foremost end portion thereof for sucking in the liquid substance from the table, a high-frequency current is supplied from the high-frequency inverter unit to the working coil to cause the liquid substance contacting member itself to generate heat by induction heating and thereby reduce viscosity of the liquid substance on the table, and the liquid substance which has been made to flow more easily can be recovered by sucking in the liquid substance into the inlet of the recovery pipe by operation of the pump, a liquid substance which tends to be solidified while it is floating on the cold sea can be effectively recovered.

In addition, the present invention provides a device for recovering a liquid substance comprising:

a pressure casing;

a pump provided in the pressure casing;

a high-frequency inverter unit provided in the pressure casing;

a pipe constituting a part of a recovery route which is connected to a suction inlet side of the pump and provided in the pressure casing movably in reciprocating motion to and from outside of the pressure casing;

a working coil which is connected to an end portion of the pipe remote from the suction inlet side of the pump and comprises a liquid substance contacting member made of a cylinder of an electric conductor and a working coil main body; and an opening cutting mechanism which is provided coaxially with the central axis of the working coil and the pipe and has cutting edges adapted to cut an opening having a size which is sufficient for the working coil to move through the opening, a high-frequency current being supplied from the high-frequency inverter unit to the working coil in a state where the working coil has moved inside of the opening cut by the opening cutting mechanism to cause the liquid substance contacting member itself to generate heat by induction heating and thereby reduce viscosity of the liquid substance, and the liquid substance being recovered by operation of the pump.

According to the invention, since the device comprises a pressure casing, a pump provided in the pressure casing, a high-frequency inverter unit provided in the pressure casing, a pipe constituting a part of a recovery route which is connected to a suction inlet side of the pump and provided in the pressure casing movably in reciprocating motion to and from outside of the pressure casing, a working coil which is connected to the foremost end portion of the pipe and comprises a liquid substance contacting member made of a cylinder of an electric conductor and a working coil main body, and an opening cutting mechanism which is provided coaxially with central axes of the working coil and the pipe and has cutting edges adapted to cut an opening having a size which is sufficient for the working coil to move through the opening, an opening can be cut by the opening cutting mechanism even in the case of a ship sunk in the deep sea and the working coil can be moved inwardly of the opening. Accordingly, viscosity of a liquid substance in the ship sunk in the deep sea can be reduced and this liquid substance can be recovered by operation of the pump.

BRIEF DESCRIPTION OF THE DRAWINGS

FIG. 2 is views for explaining a working coil in the form of a mat of another embodiment of the invention in which (a) is a partly cut-off plan view of a single coil, (b) is a partly cut-off plan view of plural coils and (c) is a sectional view.

FIG. 3 is views for explaining a cylindrical working coil of another embodiment of the invention in which (a) is a perspective view, (b) is a sectional view taken in crossing direction to the axial direction and (c) is a sectional view taken in the axial direction.

FIG. 4 is views of another embodiment of the invention in which (a) is a side view of a temperature raising unit, (b) is an end view of the temperature raising unit, (c) is a sectional view taken in the axial direction and (d) is an explanatory view showing a state in which a cylindrical working coil is mounted midway on a recovery pipe.

FIG. 5 is views of another embodiment in which (a) is a sectional view of an embodiment in which a cylindrical working coil is integrally mounted on the foremost end portion of a recovery pipe, (b) is a sectional view of the working coil shown in (a) and (c) is an end view of the working coil.

FIG. 7 is views for explaining another embodiment of the invention in which (a) is a plan view, (b) is a sectional view taken along b—b in (a) and (c) is a plan view showing a state of use.

DESCRIPTION OF THE PREFERRED EMBODIMENTS

Embodiments of the invention will be described below with reference to the accompanying drawings.

Figure 1:
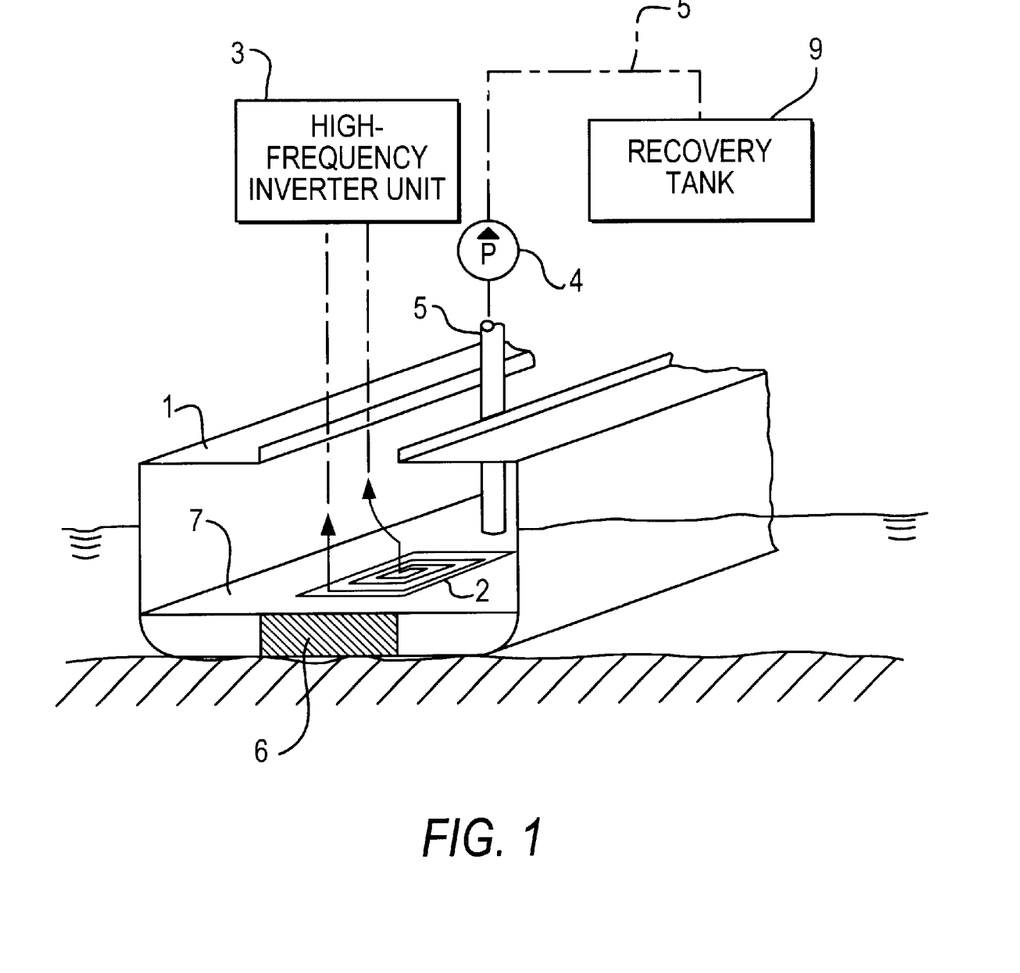
FIG. 1 is a schematic perspective view of an embodiment of the invention in which fuel oil is recovered from a fuel tank of a stranded ship.

Description will be made first about an embodiment in which, as shown in FIG. 1, intermediate fuel oil which is a kind of fuel oil is recovered by using a liquid substance recovery device from a stranded ship 1 which has run on a rock. The liquid substance recovery device used in the present embodiment is generally constructed of a working coil 2 in the form of a mat, a high-frequency inverter unit 3 for supplying a high-frequency current to this working coil 2 and a recovery pipe 5 connected to a pump 4.

The ship 1 shown in FIG. 1 stores fuel oil in a double bottom tank 6 and is not capsized. In this case, the high-frequency inverter unit 3 and the pump 4 can be installed in the ship 1. The working coil 2 in the form of a mat is applied to an inner bottom plate 7 made of a steel plate which constitutes a tank 6 and is in contact with the fuel oil. The inlet side of the recovery pipe 5 is connected to a component such as fuel oil transfer pipe or an air pipe which communicates with the inside of the tank 6 and the outlet side of the recovery pipe 5 is connected to a recovery tank 9 installed on the land or a recovery tank 9 installed in a work ship which is anchored offshore.

Figure 2A:
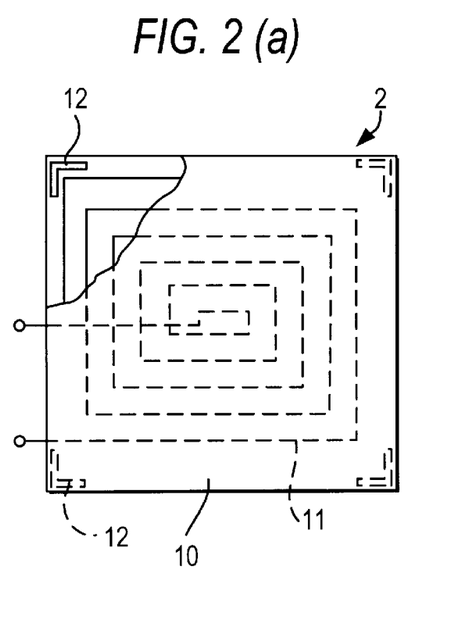
Figure 2B:
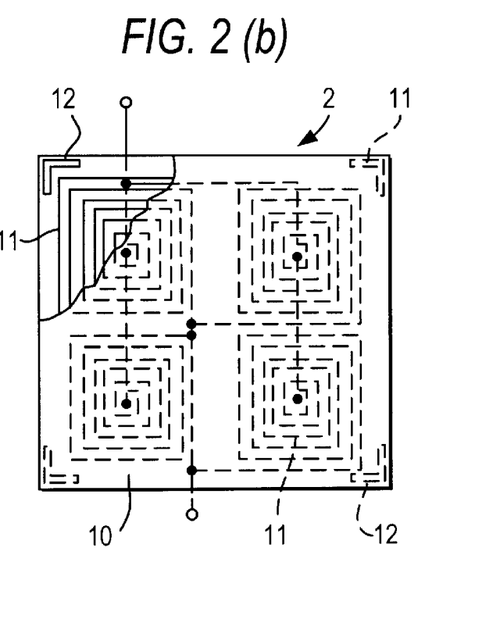
Figure 2C:
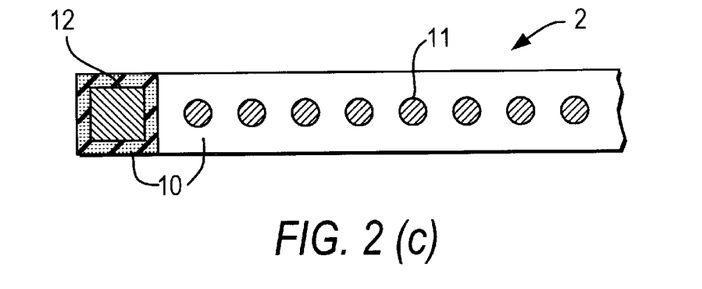

The working coil 2 in the form of a mat is constructed, as shown in FIG. 2, of a mat-like case 10 which is made of a nonmagnetic material such as rubber or plastics having heat insulating property and has flexibility, a working coil main body 11 housed in the mat-like case 10 and an attaching mechanism which attaches the mat-like case 10 to a liquid substance contacting member. Since the liquid substance contacting member is generally made of a metal such as a steel plate, a thermal insulation effect of the mat-like case 10 can be expected if it has a lower heat conductivity than the liquid substance contacting member.

The liquid substance contacting member specifically is such a member as an inner bottom plate, an outer bottom plate, a tank casing plate or a pipe portion which is a member in contact with a liquid substance contained in it or flowing through it and, since it is subjected to induction heating, made of a conductive magnetic substance. A liquid substance partitioning member is a member which partitions a portion which contains a liquid substance from an outside portion. In case it is subjected to induction heating, it is made of a conductive magnetic substance.

The working coil main body 11 may be of a single winding which, as shown in FIG. 2(a), is made of a conductor wound in a single large spiral disposed on the surface of the mat-like case 10 or may be made of plural parallel windings which, as shown in FIG. 2(b), consist of a plurality of coils 11 each formed by winding a conductor in a spiral form which are connected in parallel. In the case of a sunk ship to be described later, high water pressure is applied and, therefore, electric insulation and water proof sealing should be made accurately to prevent electrical leakage.

The attaching mechanism may be made of any construction if it can attach the working coil 2 to the liquid substance contacting member of a ship. In the present embodiment, it is made of magnets 12 which are buried in the mat-like case 10 made of rubber. This is because the liquid substance contacting member to which the working coil 2 is attached is generally made of a steel plate. For ensuring attachment, it is deairable that the magents should be disposed on four corners and, additionally, in a central portion and other portions properly so as to reduce a gap during attachment of the magnets as much as possible. As the attachment mechanism, sucking disks may also be utilized.

For attaching the mat-like working coil 2 constructed in the above described manner, it is attached, by magnetic force of the magnets 12 and with the smallest gap possible, to a selected portion which is as near as possible to the connection with the recovery pipe 5 of the inner bottom plate 7 or a tank casing plate which constitutes an outer surface of the tank 6, i.e., a steel plate which is in contact with fuel oil to be recovered. Since this mat-like working coil 2 has flexibility, it can be attached not only to a flat portion but also to a curved surface. Position and number of attaching the magnets can be changed as desired depending upon the temperature of the air during working and the ship structure.

Figure 3A:
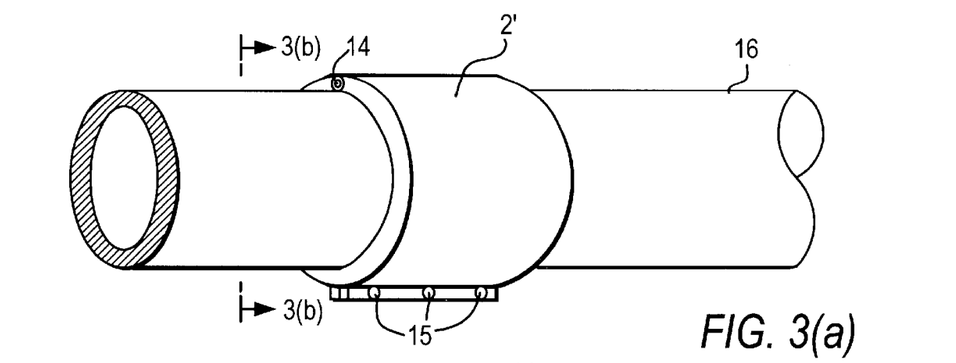
Figure 3B:
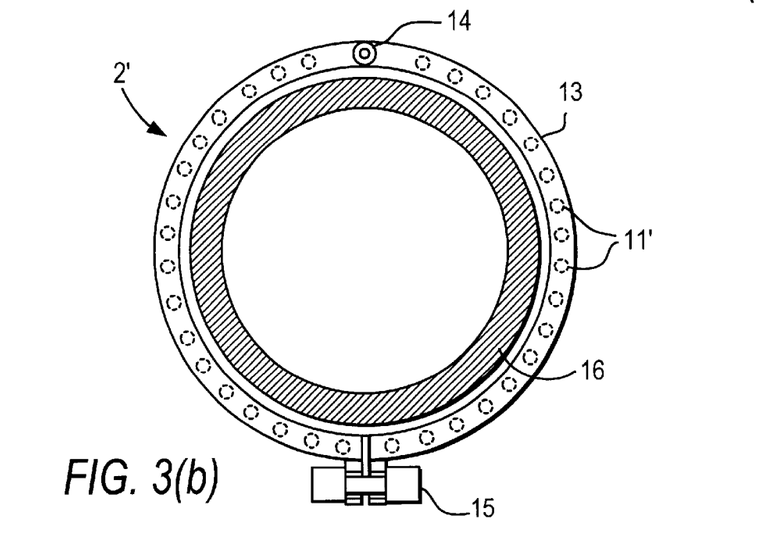
Figure 3C:
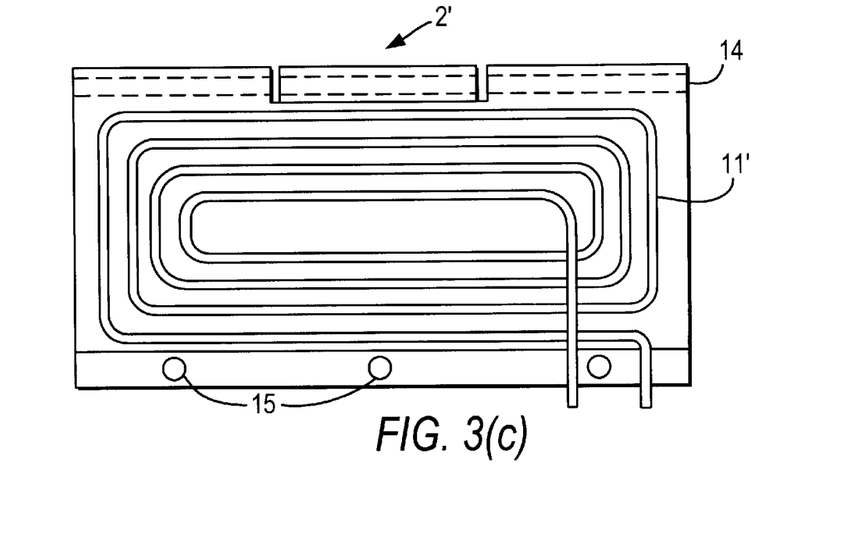

The mat-like working coil 2 is suited to heat mainly a plane such as the outer surface of the tank 6 but there are not a few cases where it is effective, depending upon the structure of the ship, to heat a pipe portion through which fuel oil flows. In such a case, it is desirable to additionally use a cylindrical working coil 2' as shown in FIG. 3. This working coil 2' comprises a cylindrical case 13 which is divided in two portions in axial direction and is provided with a hinge 14 in the divided portion to be openable in its side portion and is provided with a dosed state maintaining mechanism 15 in its openable divided portion. A working coil main body 11' is housed in the case 13. The case 13 is made of a nonmagnetic material such as plastics and rubber having heat insulating property. The working coil main body 11' housed in the case 13 is made of coils arranged in the form of a saddle and connected in series or in parallel. The closed state maintaining mechanism 15 may be made of bolts and nuts as shown in FIG. 3(b) or may be made of a toggle type fastener or a magnet.

For mounting the cylindrical working coil 2' of the above described construction to a pipe portion 16 which is a liquid substance contacting member, the case 13 is put on the pipe portion 16 with its side portions opened and then the case 13 is closed and its closed state is maintained by the closed state maintaining mechanism 15. In this state, a high-frequency current is supplied from the high-frequency inverter unit 3 to heat the pipe portion 16 by induction heating.

The high-frequency inverter unit 3 which supplies high-frequency current to the working coil 2, and 2' is one which supplies ac of, e.g., several hundred Hz to several hundred kHz and has a capacitor of a large capacity connected in parallel to the working coil 2 or 2' for increasing power factor. This inverter unit 3 should preferably be disposed in the vicinity of the working coil 2 for increasing its efficiency. In FIG. 1, it is shown in a spaced location for convenience of explanation. It should preferably be disposed on the inner bottom plate 7 in the vicinity of the working coil 2 but it may be disposed on a deck. Power source for this high-frequency inverter unit 3 may either be a commercial power source on the land or a generator provided in the work ship.

Upon supplying a high-frequency current from this high-frequency inverter unit 3 to the mat-like working coil 2, the inner bottom plate 7 liquid substance contacting member) itself which is made of a conductive magnetic substance is caused to generate heat by induction heating. By such heat generation of the steel plate itself constituting the tank 6, the inside fuel oil can be heated more efficiently than in the case it is heated from outside and, accordingly, the fuel oil can be changed to a state in which it can flow easily by rising of temperature of the fuel oil and resulting reduction in its viscosity even in the coldest season. Since the mat-like case 10 of the mat-like working coil 2 has heat insulating property, a thermal insulating effect of effectively reducing escape of heat of the heated inner bottom plate 7 to the outside can be expected and the temperature raising effect thereby can be increased.

Since a high-frequency current is supplied in the present invention, the surface portion only of the tank 6 can be heated by the skin effect and, therefore, fuel oil inside can be efficiently heated. In heating combustible fuel oil, since it is heated directly in contact with the fuel tank 6 by heat generation of the tank 6 itself without using a high temperature heat source, explosion or fire can be prevented even if the fuel oil is leaked out and, as a result, the degree of safety is very high. The temperature of the tank 6 and the pipe portion 16 can be easily controlled by controlling the high-frequency current supplied from the high-frequency inverter unit 3.

When supply is made from the high-frequency inverter unit 3 to the cylindrical working unit 2', the pipe portion 16 (liquid substance contacting member made of a steel plate) itself generates heat by induction heating. By heat generation of the pipe portion 16 which is originally provided in the ship, fuel oil inside is efficiently heated to reduce viscosity of the fuel oil in the same manner as described with respect to the tank 6.

By reducing viscosity of the fuel oil in the tank 6 or the pipe portion 16 by heating it, the fuel oil in the tank 6 can be extracted by operation of the pump 4. The extracted fuel oil can be transferred through the recovery pipe 5 and recovered in the recovery tank 9 installed on the land or in the work ship.

If the distance of transfer to the recovery tank 9 is short, drop in temperature through the recovery pipe 5 is small but in a case where the distance of transfer is as large as several tens meter, drop in temperature during the transfer becomes large, particularly in the coldest season. Therefore, as shown in FIG. 4, a temperature raising unit 20 is provided midway in the recovery pipe 5 to re-heat the fuel oil to raise temperature thereof and thereby reduce viscosity.

The temperature raising unit 20 is constructed, for example, of pipe sections 21 each made of an electric conductor such as a steel pipe which is interposed in the recovery pipe 5 made by connecting rubber hoses 5' and functions as a part of the recovery pipe 5, working coil main bodies 11" each mounted on an outer periphery of the pipe section 21 and non-conductive members 22 such as synthetic resin each having heat insulating property and covering an outer periphery of the working coil 11". When a high-frequency current is supplied from the high-frequency inverter unit 3 to the working coil main bodies 11" of the temperature raising unit 20, the pipe sections 21 made of the electric conductor themselves are caused to generate heat by induction heating and temperature of the fuel oil liquid substance) in the pipe sections 21 thereby is raised. Therefore, even in case the distance for transfer is long or the temperature of the air is low, fuel oil can be heated on the way and transferred smoothly and thereby can be recovered in the recovery tank 9.

In the temperature raising unit 20 of the present embodiment, flanges 23 are provided in end portions of the pipe section 21 made of an electric conductor and, therefore, the pipe section 21 can be disposed suitably midway in the recovery pipe 5 made of the rubber hoses 5' connected in sequence, i.e., at connections of the rubber hoses 5' and the number thereof can be selected depending upon conditions such as the distance for transfer and the temperature of the air. Further, since it is not necessary in the working coil main body 11" of the temperature raising unit 20 to open and close a divided steel pipe, the coil can be wound coaxially with the pipe either in a single winding or parallel windings.

Figure 4A:
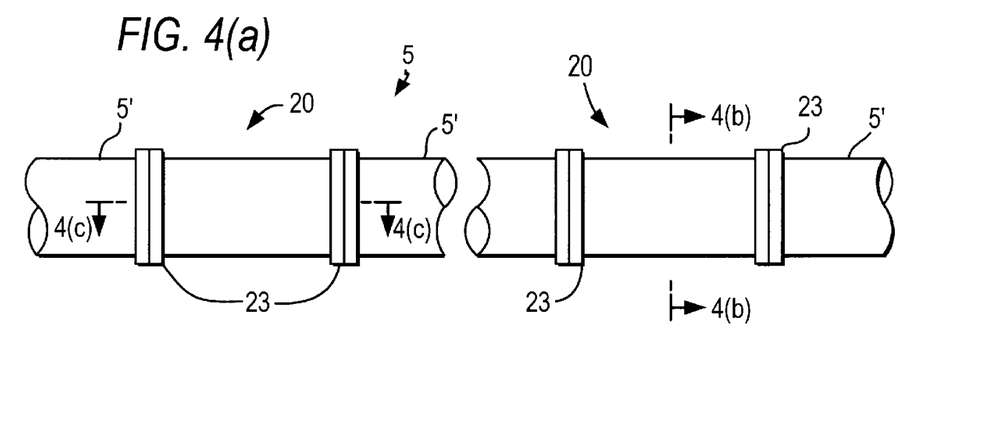
Figure 4B:
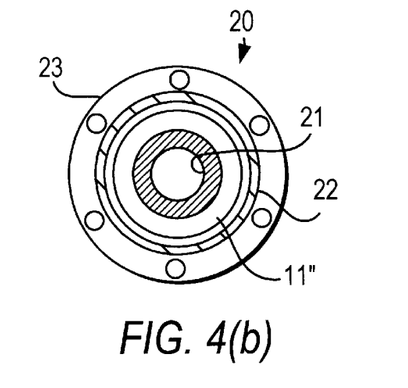
Figure 4C:
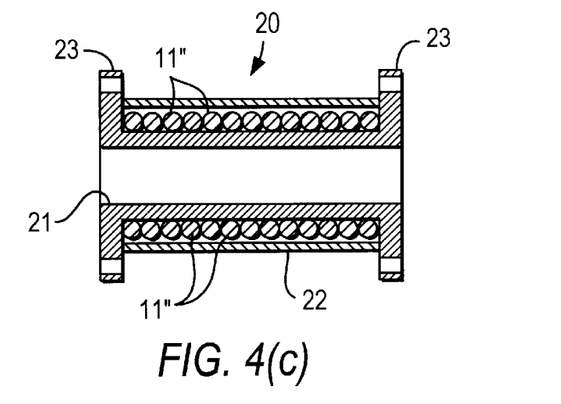
Figure 4D:
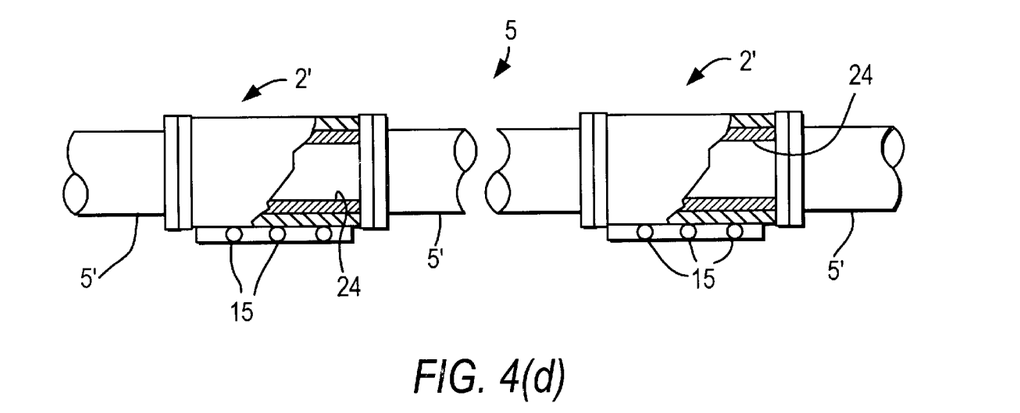

By disposing, as shown in FIG. 4(d), conductive pipes 24 suitably midway in the recovery pipe 5 made by connecting rubber hoses 5', mounting the working coils 2' on an outer periphery of the pipes 24 and supplying a high-frequency current from the high-frequency inverter unit 3 to the working coils 2', the conductive pipes 24 themselves are caused to generate heat by induction heating and temperature of flowing fuel oil thereby can be raised.

In a case where temperature is to be raised on the way in portions other than the connections of the rubber hoses 5', a temperature raising unit which is openable in side portions as in the working coil 2' is used. Although it is not illustrated, this temperature raising unit comprises, as the working coil 2', a cylindrical case which is divided in two parts in axial direction, provided with a hinge in the divided portion so that the case is openable in its side portion and provided with a closed state maintaining mechanism in the openable divided portion and a working main body housed in the cylindrical case. In the case of making the case with a nonmagnetic material such as plastics or rubber having heat insulating property, a conductive heat generating member such as a steel plate is mounted on an inner periphery of the case in such a manner that it can be divided for opening and closing. Alternatively, the case itself may be made of an electric conductor to function as the heat generating member. In short, the case has only to be an electric conductor provided on a central axis side (inside of the cylinder) of the working coil main body and the case is different from the working coil 2' in this respect only. The working coil main body housed in this case is made of coils arranged in the form of a saddle which are connected in series or in parallel. The closed state maintaining mechanism may be constructed of bolts and nuts and may also be constructed of a toggle type fastener or magnets.

For mounting the temperature raising unit of the above described construction on the way of the rubber hose 5', the case is mounted on the rubber hose 5' with its side portions being open and then the case is closed and the closed state is maintained by the closed state maintaining mechanism. In this state, a high-frequency current is supplied from the high-frequency inverter unit 3 to the working coil main body to cause the heat generating plate to generate heat by induction heating. Accordingly, the rubber hose 5' is heated by this heat from outside to raise temperature of the liquid substance such as fuel oil flowing inside.

In the above described embodiment, the working coils 2 and 2' are applied to the liquid substance contacting member such as the inner bottom plate 7 or the pipe portion 16 which is a part of the ship in contact with the fuel oil to cause the liquid substance contacting member itself, i.e., a part of the ship itself, to generate heat. Since, however, an object to be heated is a liquid substance to be recovered, it will suffice if this liquid substance is heated.

Therefore, a part of a liquid substance recovery device may be constructed in a manner to be inserted from outside to inside of an originally existing liquid substance contacting member (liquid substance partitioning member). For example, the liquid substance recovery device shown in FIG. 5 comprises a working coil 30 which is adapted to be inserted from outside to inside of a liquid substance partitioning member (inner bottom plate 7; tank casing plate) which defines a section (tank 6) containing fuel oil to be recovered, a high-frequency inverter unit 3 for supplying a high-frequency current to the working coil 30, and a recovery pipe 5 connected to a pump 4. This working coil 30 is connected to an end portion of the recovery pipe 5 connected to a sucking inlet side of the pump 4 and comprises a cylinder 32 made of an electric conductor which is adapted to be inserted inwardly of an opening 31 formed in the liquid substance partitioning member (inner bottom plate 7), and a working coil main body 33 wound on a peripheral surface of the cylinder 32. The cylinder 32 functions as a liquid substance contacting member and is constructed, for example, of two layer iron pipes which are overlapped with a gap between the outer pipe and the inner pipe. A flange 34 which constitutes a connecting section with the recovery pipe 5 is formed in one end portion of the cylinder 32 and the working coil main body 33 is hermetically received in the gap between the outer pipe and the inner pipe.

Figure 5A:
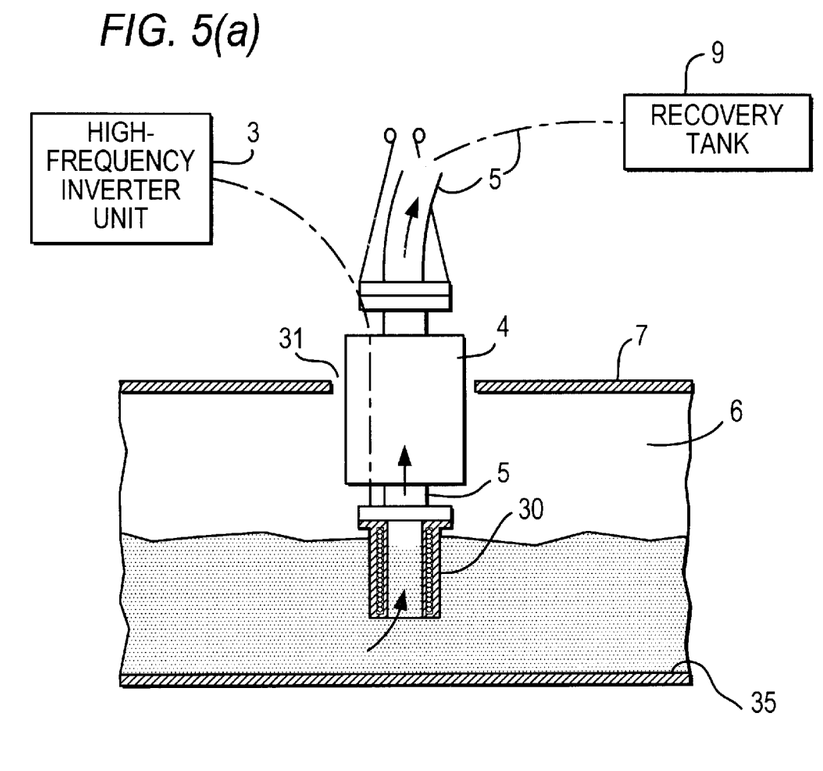
Figure 5B:
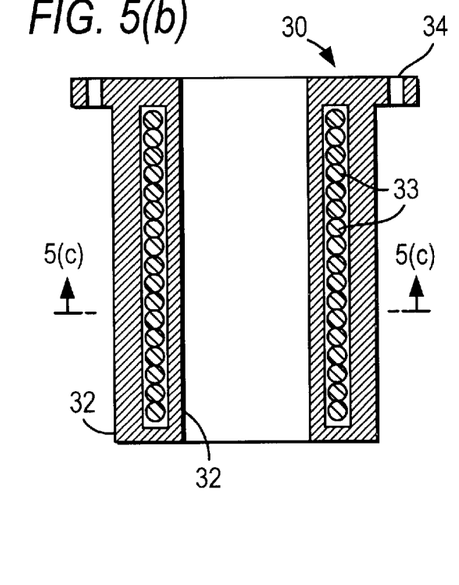
Figure 5C:
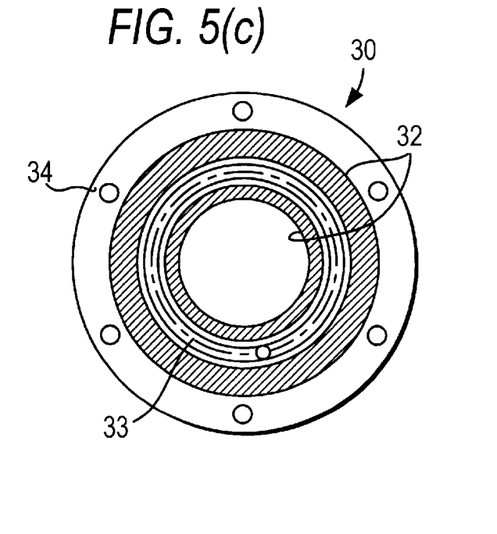

For extracting fuel oil from the tank 6 of a stranded ship 1 by the liquid substance recovery device of the above described construction, the cylinder 32 is connected at the flange 34 to the lower end portion of the recovery pipe 5 and, in a state of being suspended by a crane or the like, is inserted inwardly of the liquid substance partitioning member from the opening 31 such as a manhole hatch and the cylinder 32 functioning as the liquid substance contacting member thereby is inserted in the fuel oil. In this state, a high-frequency current is supplied from the high-frequency inverter unit 3 to the working coil main body 33 of the working coil 30 to cause the cylinder 32 itself to generate heat by induction heating. Accordingly, the fuel oil in contact with inner peripheral surface and the outer peripheral surface of the cylinder 32 is heated and viscosity thereof is reduced. As the pump 4 is operated, the fuel oil about the cylinder 32 of which the viscosity has been reduced can be absorbed and recovered to the recovery tank 9 through the recovery pipe 5.

Since this liquid substance recovery device can be adjusted in its height of suspension when the liquid level of the fuel oil has dropped, a portion of the fuel oil in the vicinity of the liquid surface can be effectively heated. If a submerged pump is used as the pump 4, heating and absorbing operations can be made with the pump 4 submerged. In this case, the pump 4 can be operated in a state in which it is lowered onto the tank bottom plate 35. In this case, it is desirable for the cylinder 32 to be provided with legs or projections (not shown) projecting downward so that the opening at the lower end of the cylinder 32 will not be closed.

Figure 6:
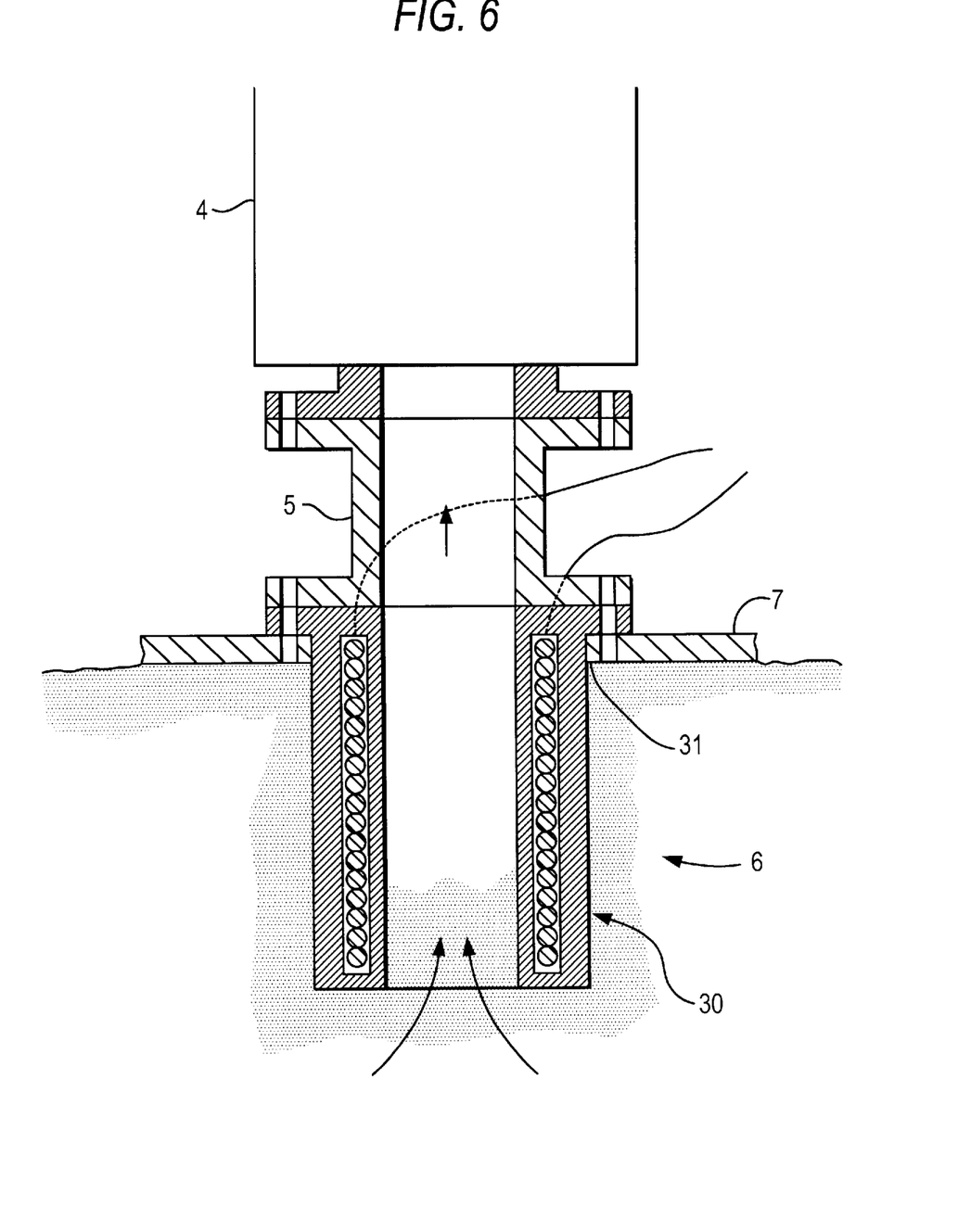
FIG. 6 is a sectional view of another embodiment of the invention showing a state with the working coil of FIG. 5 being mounted on an inner bottom plate.

This working coil 30 may be used in such a manner that, as shown in FIG. 6, an opening 31 is formed in the tank casing plate (inner bottom plate 7) which constitutes the tank 6 and the working coil 30 is fixed about the opening 31. In this case, the working coil 33 may be provided in a part of the recovery pipe 5 connected to the sucking inlet of the pump 4.

A liquid substance recovery device for recovering fuel oil or the like which has flowed to the surface of the sea due to damage of a ship or the like cause will now be described.

Figure 7A:
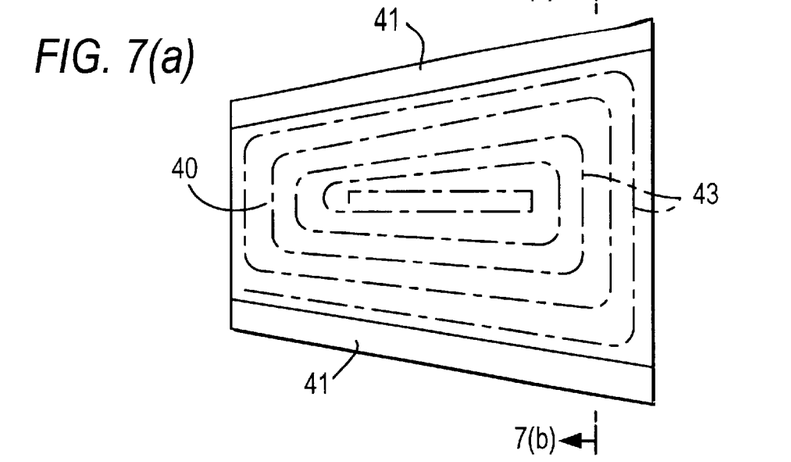
Figure 7B:
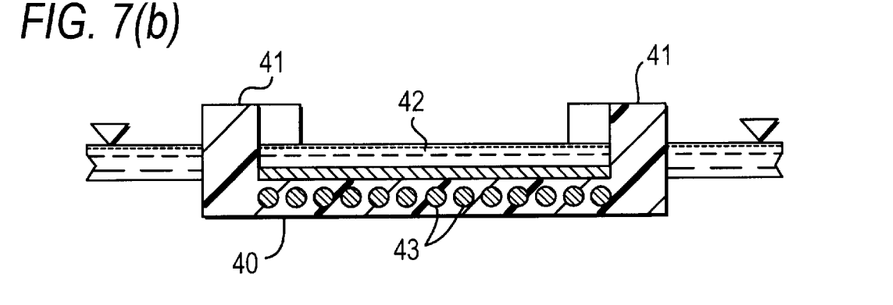

This liquid substance recovery device comprises, as shown in FIG. 7, a table 40, floats 41 which float on water for floating the table 40 in such a manner that a liquid substance such as fuel oil floating on water flows onto an upper surface of the table 40, a liquid substance contacting member 42 made of an electric conductor and provided on the upper surface of the table 40, a working coil 43 provided along the liquid substance contacting member 42, a high-frequency inverter unit 3 provided on a recovery ship 44 for supplying a high-frequency current to the working coil 43, and a recovery pipe 5 connected to a pump 4. The table 40 is a plate of a generally trapezoidal shape made of a nonmagnetic substance such as plastics and floats 41 made of foamed plastic are provided on tapered side edges of the table 40 in a manner to project above the water level to enable them to function as a guide for introducing a liquid substance to be recovered. A conductor such as an iron plate is provided as the liquid substance contacting member 42 on the upper surface of the table 40 and the working coil 43 of a flat trapezoidal form in a plan view is buried in the thickness of the table 40.

Although not illustrated, a ceiling plate may be provided above the table 40 with a certain interval to form a cylinder and a working coil winding this cylinder may be provided. In this example and also in the example of FIG. 7, the working coil may be of a single winding or plural windings connected in parallel.

The inlet opening at the foremost end of the recovery pipe 5 may be floated on the water surface by the buoyancy of the floats so as to facilitate absorption of the liquid substance from above the table 40. For example, a funnel-shaped introduction guide member (not shown) having an increasing width toward the foremost end and facing upward may be connected to the float with its lower end portion having a small width being connected to the foremost end portion of the recovery pipe 5. The pump 4 and the high-frequency inverter unit 3 may be housed in the portion supported by the float thereby to constitute an oil skimmer 45. The above described mat-like working coil 2 may be provided in the portion supported by the float or the introduction guide member and the cylindrical working coil 2' may be provided midway in the recovery route 5 from the inlet to the recovery tank 9 of the recovery ship 44 through the pump 4. The introduction guide member should preferably be constructed in such a manner that height of the inlet portion opening at the upper end will be adjusted.

Figure 7C:
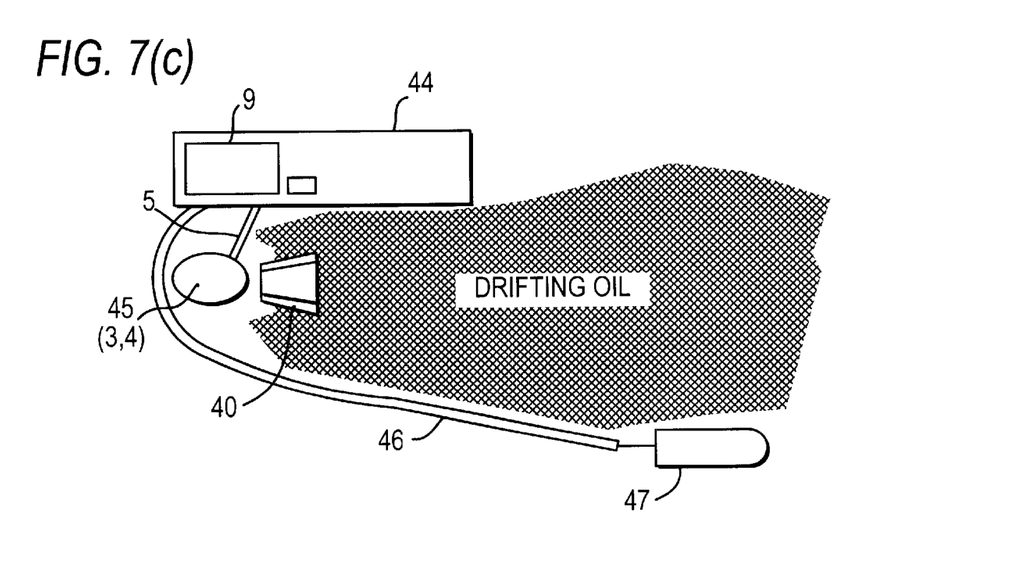

As shown in FIG. 7(c), one end of an oil fence 46 is connected to a recovery ship 44 and the other end thereof is connected to an oil boom expanding ship 47. This oil boom expanding ship 47 is operated to run and collect fuel oil, emulsified oil etc. drifting on the sea to the side of the recovery ship 44 while high-frequency is supplied from the high-frequency inverter unit 3 to the working coil 43 to cause the liquid substance contacting member 42 itself provided on the upper surface of the table 40 to generate heat. Since drifting fuel oil and emulsified oil etc. have been introduced to the upper surface of the table 40, the fuel oil etc. on the liquid substance contacting member 42 is heated by the heat generated by the liquid substance contacting member 42 itself and viscosity thereof is thereby reduced. As the upper end inlet portion of the introduction guide member opening about the oil skimmer 45 is caused to approach the narrow width portion of the table 40, fuel oil etc. on the table 40 which have been reduced in viscosity flow into the introduction guide member and is guided thereby to be absorbed into the recovery pipe 5 and the fuel oil etc. floating on the sea can thereby be recovered efficiently.

An embodiment according to which fuel oil can be recovered from a sunk ship 1 will now be described.

Figure 8:
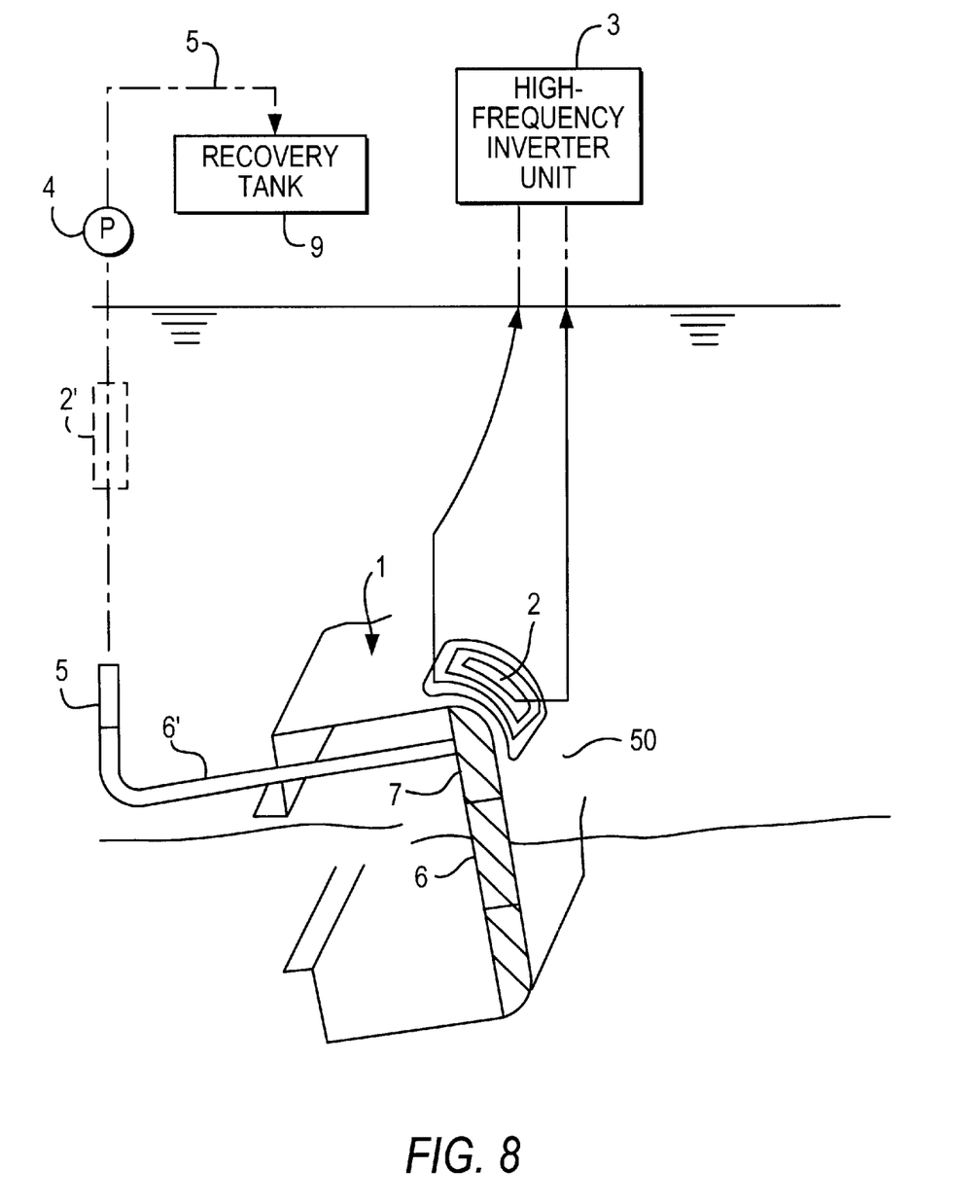
FIG. 8 is a schematic perspective view of an essential portion of another embodiment of the invention in which fuel oil is recovered from a fuel tank of a sunk ship.

In a case where, as shown in FIG. 8, fuel oil is recovered from a tank 6 of a ship 1 which has fallen sideways on the bottom of the sea, a workman dives and connects the foremost end of a recovery pipe 5 connected to a pump 4 to a portion communicating with the inside of the tank 6, e.g., an air pipe 6' of the tank. In case where the sunk ship lies upside down and, therefore, there is no portion to connect the recovery pipe 5, an opening is formed in the outer bottom plate of the ship and the recovery pipe 5 is connected to this opening.

The mat-like working coil 2 is applied to the bottom 50 or the inner bottom plate 7 corresponding to the tank 6 and a high-frequency current is supplied from the high-frequency inverter unit 3 mounted on a work ship (not shown) to the working coil 2. Upon supplying the high-frequency current to the working coil 2, in the same manner as in the above described embodiment, the bottom 50 or the inner bottom plate 7 itself which is an electric conductor is caused to generate heat by induction heating so that fuel oil in the tank 6 is heated directly by operation from outside.

Therefore, even when water temperature at the bottom of the sea is low and viscosity of fuel oil in the tank 6 is high, the viscosity is reduced by the above described heating. Accordingly, the fuel oil which has been reduced in viscosity can be extracted through the recovery pipe 5 by operation of the pump 4 and can be recovered in the recovery tank 9 of the work ship.

Since the efficiency can be improved by disposing the high-frequency inverter unit 3 in the vicinity of the working coil 2, it should preferably be disposed in the sea.

Since temperature can be raised on the way of recovery by providing the cylindrical working coil 2', the recovery can be made accurately and easily.

In case the ship is sunk in the deep sea, a workman cannot work by diving in the sea and, in this case, an underwater remotely operated vehicle (ROV, not shown) having a camera and a robot arm is used. Work such as connecting the recovery pipe 5 and mounting the working coil 2 is performed by operating the robot arm by a remote-controlled operation while watching a monitor of the camera on the work ship.

After connecting the recovery pipe 5 and mounting the working coil 2 in this manner, in the same manner as in the case that the ship is sunk in the shallow sea, a high-frequency current is supplied from the high-frequency inverter unit 3 on the work ship to the working coil 2 to heat fuel oil in the tank 6 and thereby reduce viscosity thereof. Accordingly, the fuel oil which now flows easily can be extracted and recovered in the recovery tank 9 on the work ship.

In a case where the ship is sunk in the deep sea and the recovery pipe cannot be connected easily to an air pipe or the like opening, it is desirable to use a liquid substance recovery device having a function of forming an opening in the outer bottom plate, a function of heating by the working coil and a function of a pump for recovering a liquid substance. For example, a liquid substance recovery device 51 shown in FIG. 9 comprises a hermetic pressure casing 52, a pump 4 provided in the pressure casing 52, a high-frequency inverter unit 3 provided in the pressure casing 52, a pipe 53 constituting a part of a recovery route which is connected to a suction inlet side of the pump 4 and provided in the pressure casing 52 movably in reciprocating motion to and from outside of the pressure casing 52, a working coil 56 which, in the same manner as the above described working coil 30, is connected to the foremost end portion of the pipe 53 and comprises a liquid substance contacting member 54 made of a cylinder of an electric conductor and a working coil main body 55, and an opening cutting mechanism which is provided coaxially with central axes of the working coil 56 and the pipe 53 and has cutting edges adapted to cut an opening having a size which is sufficient for the working coil 56 to move through the opening.

Figure 9:
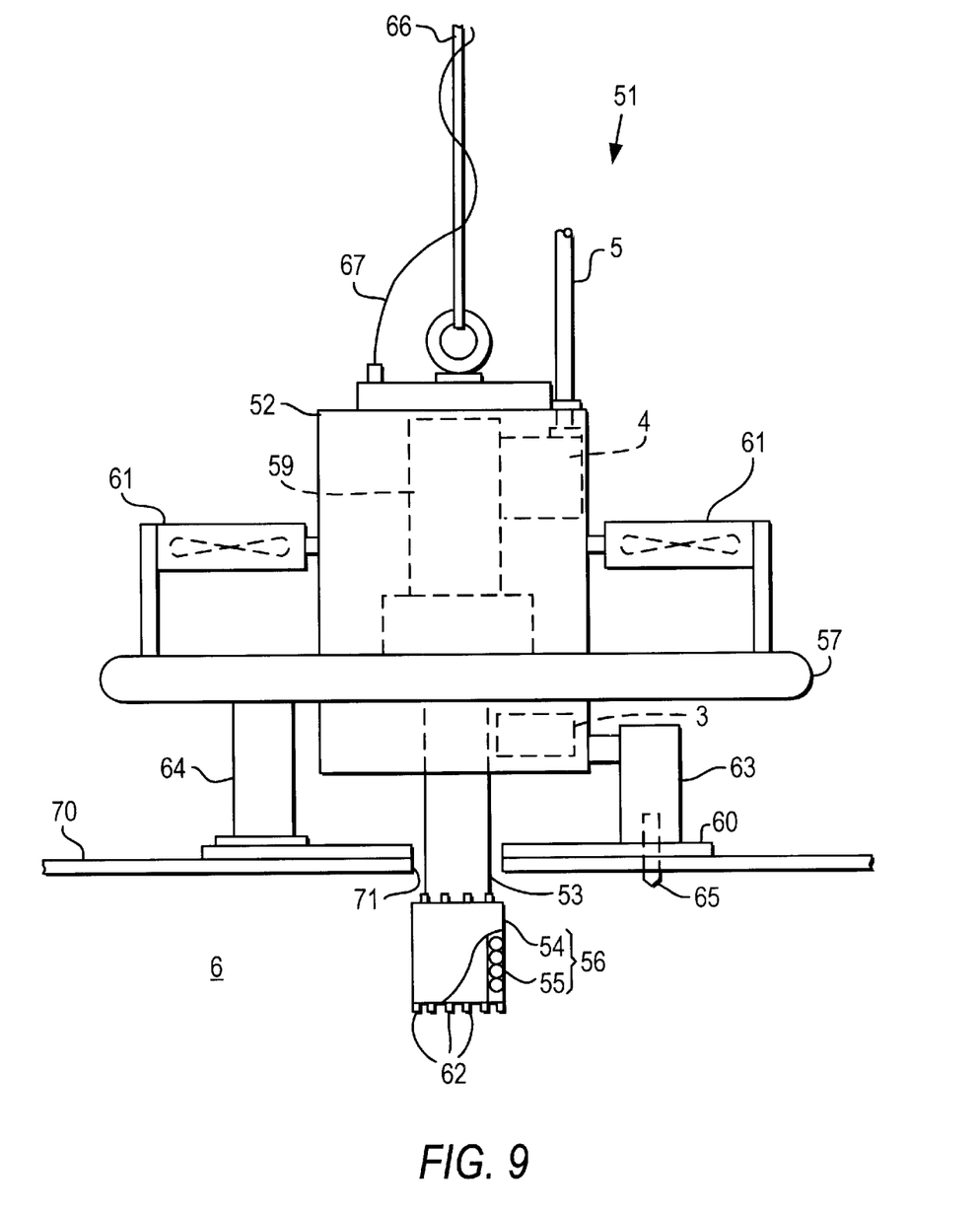
FIG. 9 is a schematic front view of another embodiment of a liquid substance recovery device of the invention for recovering fuel oil from a fuel tank of a sunk ship.

More specifically, the hermetic pressure casing 52 is provided in a central portion of a frame 57 and, in this pressure casing 52 are provided components including the pump 4, the high-frequency inverter unit 3, and a rotation-reciprocation drive mechanism 59 which causes the pipe 53 connected to the sucking inlet of the pump 4 to be rotated and to move in reciprocating motion outwardly and inwardly of the lower surface of the casing 52. A mounting base 60 is detachably provided below the casing 52 and propelling devices 61 are provided above the frame 57 in a manner to be connected to both sides of the casing 52. The pipe 53 which is reciprocable (upward and downward) from the lower surface of the casing 52 is mounted at its foremost end (lower end) with the cylindrical working coil 56 which communicates with the pipe 53. Cutting edges 62 are provided in the foremost end portion of a cylinder made of an electric conductor (liquid substance contacting member 54) of the working coil 56. On the mounting base 60 are provided a plurality of tapping screw mechanisms 63 and a plurality of separating mechanisms 64 about the central opening. Each tapping screw mechanism includes a fixing shaft 65 in the form of a tapping screw having a drill section at the foremost end portion, a tap section formed above the drill section, and a bolt thread section formed above the tap section and a mechanism for rotating this fixing shaft 65. In FIG. 9, reference character 66 designates a wire suspending the liquid substance recovery device 51 from the work ship, reference character 5 designates a recovery pipe connected to the outlet of the pump 4 and reference character 67 designates a bundle of cords including power supply cords for supplying electric power to the high-frequency inverter unit 3 and lighting lamps and wires for sending information from a camera (not shown) to the work ship.

For recovering fuel oil, for example, from the tank 6 of a sunk ship by using the liquid substance recovery device 51, the device 51 is lowered from the work ship to a position above the sunk ship with the pipe 53 being contracted and the cutting edges 62 at the foremost end thereof not projecting from the mounting base 60 (i.e., in a withdrawn state) and is set at a desired position which is preferably as high a position as possible on the outer bottom plate or the like corresponding to the tank 6. Then, after the mounting base 60 is placed in this position, the propelling devices 61 are operated to push the recovery device 51 downward while the tapping screw mechanisms 63 are operated to rotate the fixing shafts 65 and thereby open holes and cut threads in the outer bottom plate 70 and screw the bolt thread sections in the threads. Upon completion of this work, by screwing of the bolt thread sections of the fixing shafts 65 to the outer bottom plate 70, the mounting base 60 is tightly fixed to the outer bottom plate 70. The recovery device 51, therefore, is stable even if it is in an inclined state. Reaction force produced during the work can be received by combined force of the self-weight of the recovery device 51 and the propelling force of the propelling devices 61.

Then, the rotation-reciprocation drive mechanism 59 is operated to advance (move downward) the pipe 53 until the cutting edges 62 at the lower end to abut against the outer bottom plate 70. Upon abutting of the cutting edges 62 against the outer bottom plate 70, the pipe 53, i.e., the cutting edges 62, is rotated to cut the outer bottom plate 70 and the pipe 53 is lowered slowly to form an opening 71 in the outer bottom plate 70. After forming of the opening 71, the pipe 53 is lowered further to insert the working coil 56 into the fuel oil. Since the recovery device 51 is rigidly fixed to the outer bottom plate 70 by the fixing shafts 65 of the mounting base 60, reaction force produced during the work can be received fully by the fixing shafts 65 without lifting or shifting of the recovery device 51.

After forming the opening 71 in the outer bottom plate 70 and inserting the working coil 56 in the tank 6 in the above described manner, a high-frequency current is supplied to the working coil 56 in the same manner as in the above described embodiment, and the cylinder (liquid substance contacting member) 54 of the working coil 56 itself thereby is caused to generate heat by induction heating. Accordingly, fuel oil in contact with the inner and outer peripheral surfaces of the cylinder 54 is heated and viscosity of the fuel oil thereby is reduced. When the pump 4 is operated, the fuel oil about the cylinder 54 which has been reduced in viscosity is absorbed and can be recovered in the recovery tank on the work ship through the recovery pipe 5. For heating fuel oil in the tank 6, it is desirable to provide, in addition to the recovery device 51, the mat-like working coil 2 on the outer bottom plate 70 for heating. For preventing increase in viscosity due to cooling of fuel oil on the way between the recovery device 51 and the recovery tank on the work ship, it is desirable to provide the cylindrical working coil 2' or the temperature raising unit 20 midway in the recovery pipe 5.

After completion of recovery of fuel oil, the pipe 53 is withdrawn (moved upward) to pull off the working coil 56 from the opening 71 and then the separating mechanism 64 is actuated to separate the mounting base 60 from the recovery device 51. Accordingly, the mounting base 60 remains fixed to the outer bottom plate 70. After finishing detachment of the mounting base 60, the recovery device 51 is lifted and withdrawn on the work ship.

In this liquid substance recovery device 51, the cylindrical working coil 56 is provided at the foremost end of the pipe 53 which constitutes a part of the recovery pipe 5 and the cutting edges 62 are provided at the foremost end of the cylinder 54 of the working coil 56 so that the working coil 56 itself is made a part of the opening cutting mechanism. This arrangement, however, requires a complicated wiring for the working coil 56 which is a rotary member. Therefore, the opening cutting mechanism may be provided separately from the working coil 56. For example, cutting edges may be provided at the foremost end (lower end) of a pipe member driven by a rotation-reciprocation drive mechanism provided in the casing 52, a pipe constituting a part of the recovery pipe 5 may be reciprocably provided in the inside of the pipe, and a cylindrical working coil may be provided at the foremost end (lower end) of this pipe. In case the recovery device is constructed in this manner, an opening is formed in the outer bottom plate by lowering and rotating the outer pipe and then the inside pipe is lowered to insert the working coil into the tank from the opening to reduce viscosity of the fuel oil. By adopting this structure, wiring for the working coil is simplified and manufacture of the working coil is facilitated.

A ship which has been capsized due to a marine accident sometimes drifts with its bottom facing upside (not shown). In this case, an opening is formed in the outer bottom plate exposed above the surface of the sea, the recovery pipe 5 is connected to this opening and the mat-like working coil 2 etc. are suitably applied to the outer bottom plate. Then, a high-frequency current is supplied from the high-frequency inverter unit 3 installed on the drifting ship or on the work ship to the working coil 2 to cause the outer bottom plate itself to generate heat by induction heating. Viscosity of fuel oil in the fuel tank thereby is reduced and, by operation of the pump 4 provided on the work ship, the fuel oil in the fuel tank is recovered from the fuel tank of the ship to the recovery tank on the work ship through the recovery pipe 5.

Industrial Utility

As described in the foregoing, the method and device for recovering a liquid substance according to the invention are suited for recovering a liquid substance such as fuel oil from a fuel tank or the like of a ship which has been stranded or sunk, or is drifting after being capsized and also are suited for recovering crude oil or chemical liquid substance from a storage tank of a tanker. Further, the method and device are suited for recovering a liquid substance not only from a ship but also from a submarine oil field drilling rig, a crude oil loading and unloading facility etc.

What is claimed is:

1. A method for recovering a liquid substance by applying a working coil to a liquid substance contacting member which is a member of a tank containing the liquid substance is in contact with the liquid substance containing in it or flowing through it and is made of an electric conductor, supplying a high-frequency current from a high-frequency inverter unit to the working coil to cause the liquid substance contacting member itself to generate heat by induction heating and thereby reducing viscosity of the liquid substance, and recovering this liquid substance through a recovery pipe connected to a pump.

2. A device for recovering a liquid substance comprising:
   a working coil which is mountable on a liquid substance contacting member which is a member of a tank containing a liquid substance is in contact with the liquid substance contained in it or flowing through it and is made of an electric conductor;
   a high frequency inverter unit for supplying a high-frequency current to the working coil; and
   a recovery pipe which is connected to a pump and is adapted to be connected to the liquid substance contacting member;
   a high-frequency current being supplied from the high-frequency inverter unit to the working coil to cause the liquid substance contacting member itself to generate heat by induction heating to thereby reduce viscosity of the liquid substance, and the liquid substance being recovered through the recovery pipe by operation of the pump.

3. A device for recovering a liquid substance as defined in claim 2 characterized in that the working coil comprises a case in the form of a mat which is made of a nonmagnetic and flexible material, a working coil main body housed in the case, and an attaching mechanism for attaching the case to the liquid substance contacting member, the case being applied to a surface of the liquid substance contacting member and attached to the liquid substance contacting member by means of the attaching mechanism.

4. A device for recovering a liquid substance as defined in claim 3 wherein the recovery pipe comprises a temperature raising unit provided in the middle thereof, said temperature raising unit comprising a cylindrical case which is divided in two parts in axial direction, provided with a hinge in the divided portion so that the case is openable in its side portion and provided with a closed state maintaining mechanism in the openable divided portion, a working coil main body housed in the cylindrical case, and a heating member made of an electrical conductor which is provided on a central axis side of the working coil main body, said heating member itself being heated by induction heating by a high frequency current being supplied by the high-frequency inverter unit used to raise the temperature of the liquid substance in the recovery pipe.

5. A device for recovering a liquid substance comprising:
   a pressure casing;
   a pump provided in the pressure casing;
   a high-frequency inverter unit provided in the pressure casing;

a pipe constituting a part of a recovery route which is connected to a suction inlet side of the pump and provided in the pressure casing movably in reciprocating motion to and from outside of the pressure casing;

a working coil which is connected to an end portion of the pipe remote from the suction inlet side of the pump and comprises a liquid substance contacting member made of a cylinder of an electric conductor and a working coil main body; and an opening cutting mechanism which is provided coaxially with the central axis of the working coil and the pipe and has cutting edges adapted to cut an opening having a size which is sufficient for the working coil to move through the opening, a high-frequency current being supplied from the high-frequency inverter unit to the working coil in a state where the working coil has moved inside of the opening cut by the opening cutting mechanism to cause the liquid substance contacting member itself to generate heat by induction heating and thereby reduce viscosity of the liquid substance, and the liquid substance being recovered by operation of the pump.

* * * * *